United States Patent
Russell et al.

(10) Patent No.: US 9,207,981 B2
(45) Date of Patent: Dec. 8, 2015

(54) SYSTEMS AND METHODS FOR POWER AWARENESS IN MOBILE APPLICATIONS

(71) Applicant: Google Inc., Mountain View, CA (US)

(72) Inventors: Gregory Fraser Russell, New York, NY (US); Mark Mentovai, New York, NY (US); Anthony Julian Aiuto, New York, NY (US); David Aristizabal, New York, NY (US)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 14/102,729

(22) Filed: Dec. 11, 2013

(65) Prior Publication Data

US 2014/0281648 A1    Sep. 18, 2014

Related U.S. Application Data

(60) Provisional application No. 61/791,326, filed on Mar. 15, 2013.

(51) Int. Cl.
*G06F 9/50* (2006.01)
*G06F 9/48* (2006.01)
*G06F 1/32* (2006.01)

(52) U.S. Cl.
CPC .............. *G06F 9/4893* (2013.01); *G06F 1/32* (2013.01); *Y02B 60/142* (2013.01); *Y02B 60/167* (2013.01); *Y02B 60/50* (2013.01)

(58) Field of Classification Search
CPC .............................. G06F 1/3212; G06F 9/4893
See application file for complete search history.

(56) References Cited

U.S. PATENT DOCUMENTS

| | | | |
|---|---|---|---|
| 7,730,331 B2 | 6/2010 | Yoon et al. | |
| 2005/0085277 A1 | 4/2005 | Chen et al. | |
| 2008/0057894 A1 | 3/2008 | Aleksic et al. | |
| 2008/0178032 A1 | 7/2008 | Walrath | |
| 2009/0217065 A1* | 8/2009 | Araujo, Jr. ............ | G06F 1/3203 713/320 |
| 2010/0088707 A1* | 4/2010 | Corn ..................... | G06F 9/5027 718/104 |
| 2011/0040996 A1 | 2/2011 | Hackborn et al. | |

* cited by examiner

*Primary Examiner* — Albert Wang
(74) *Attorney, Agent, or Firm* — McDonnell Boehnen Hulbert & Berghoff LLP

(57) ABSTRACT

A data processing device may comprise one or more applications. Based on communication from a particular application, the data processing device may be operable to provide, to the particular application, power consumption information of the data processing device associated with each of a plurality of application states of the particular application and/or information related to one or more power-consuming components in the data processing device. The particular application may register with the data processing device to receive a notification when a power consuming component is available for use. The particular application may also perform operations based on the provided power consumption information and/or the provided information related to the one or more power-consuming components. The plurality of application states may comprise an application idle state and one or more application active states.

20 Claims, 12 Drawing Sheets

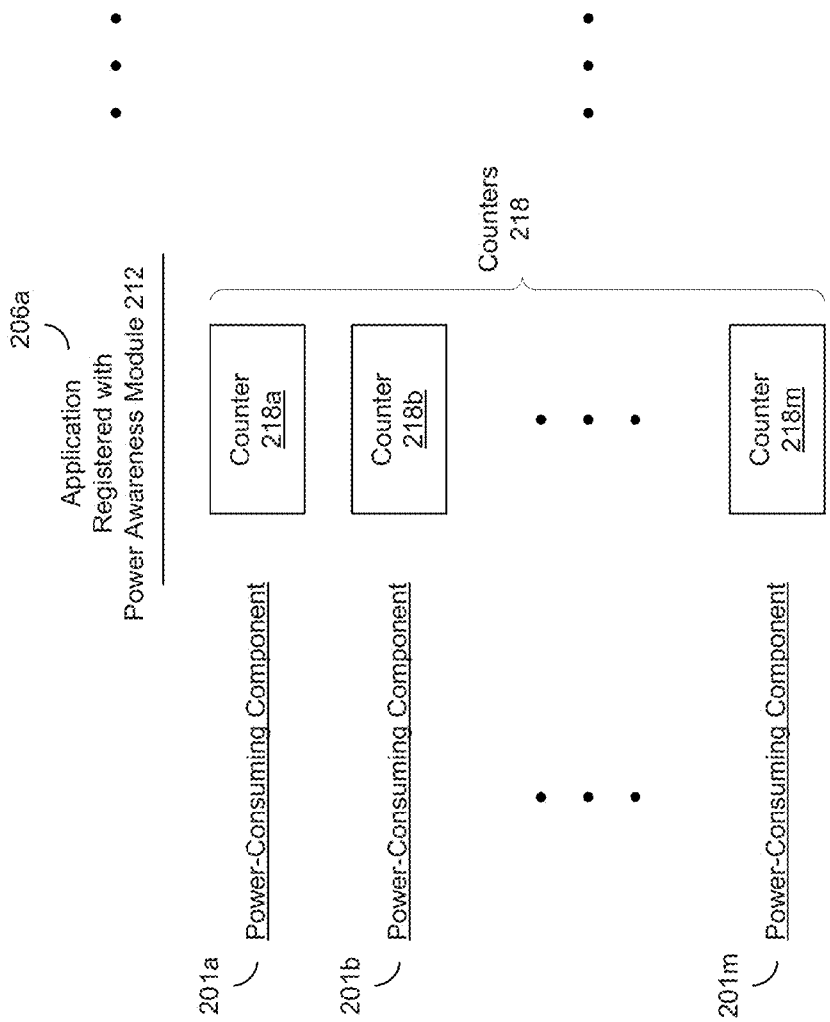

SYSTEMS AND METHODS FOR POWER AWARENESS IN MOBILE APPLICATIONS

CROSS REFERENCE TO RELATED APPLICATION

The present application claims priority to U.S. Provisional patent application Ser. No. 61/791,326, filed on Mar. 15, 2013, and entitled "Power Awareness Improvement in Mobile Applications," which is herein incorporated by reference as if fully set forth in this description.

TECHNICAL FIELD

Certain embodiments of the disclosure relate to data processing device power consumption. More specifically, certain embodiments of the disclosure relate to methods and systems for power awareness in mobile applications.

BACKGROUND

Data processing devices, such as smart phones, mobile phones, tablets and/or other mobile devices, may have a limited battery life. Some mobile applications running on the data processing devices may cause excessive battery drain, and the applications may not have enough information about their power consumption to make sensible compromises. Additionally, the mobile applications may not have access to pertinent information about how much they are impacting the battery life of the data processing devices. Consequently, users of the data processing devices may find the battery life of the data processing devices unpredictable.

SUMMARY

Within examples, systems and methods for power awareness in mobile applications are provided.

In one aspect, the present disclosure describes a method. The method comprises receiving at a device comprising one or more applications and one or more power-consuming components: power consumption information indicative of an amount of power consumption by a power-consuming component of the one or more power-consuming components, battery information indicative of power remaining in a battery of the device, and a request from a particular application of the one or more applications to perform an operation utilizing the power-consuming component. The particular application is configured to provide an indication of a period of time the particular application is configured to wait before using the power-consuming component to perform the operation. The method also comprises providing, based on the power consumption information, the battery information, and the period of time, a notification to the particular application indicating when the power-consuming component is available for use by the particular application.

In another aspect, the present disclosure describes a device. The device comprises one or more applications; one or more power-consuming components; a battery; at least one processor in communication with the one or more applications, the one or more power consuming components, and the battery; and data storage comprising executable instructions that, when executed by the at least one processor, cause the device to perform functions. The functions comprise receiving: power consumption information indicative of an amount of power consumption by a power-consuming component of the one or more power-consuming components, battery information indicative of power remaining in the battery, and a request from a particular application of the one or more applications to perform an operation utilizing the power-consuming component. The particular application is configured to provide an indication of a period of time the particular application is configured to wait before using the power-consuming component to perform the operation. The functions further comprise providing, based on the power consumption information, the battery information, and the period of time, a notification to the particular application indicating when the power-consuming component is available for use by the particular application.

In still another aspect, the present disclosure describes a method. The method includes obtaining, by an application among a plurality of applications executable by a device having one or more power-consuming components, power consumption information indicative of power consumption resulting from the application utilizing a power-consuming component of the one or more power-consuming component to perform an operation. The method also includes receiving battery information indicative of power remaining in a battery of the device and a rate of power consumption of the battery as a result of the plurality of applications utilizing the one or more power-consuming components. The method further includes the application determining, based on the power consumption information, the battery information, and information associated with a period of time the application is configured to wait before using the power-consuming component to perform the operation, whether to continue performing the operation or defer the operation for a predetermined amount of time.

In still another aspect, the present disclosure describes a device comprising one or more applications; one or more power-consuming components; and a battery. The device comprises a means for receiving: power consumption information indicative of an amount of power consumption by a power-consuming component of the one or more power-consuming components, battery information indicative of power remaining in the battery, and a request from a particular application of the one or more applications to perform an operation utilizing the power-consuming component. The particular application is configured to provide an indication of a period of time the particular application is configured to wait before using the power-consuming component to perform the operation. The device further comprises means for providing, based on the power consumption information, the battery information, and the period of time, a notification to the particular application indicating when the power-consuming component is available for use by the particular application.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 2B is a block diagram illustrating example counters in a data processing device, in accordance with an example embodiment of the disclosure.

DETAILED DESCRIPTION

Certain embodiments of the disclosure can be found in methods and systems for power awareness in mobile applications. Certain specific details are set forth in the following description and in figures to provide a thorough understanding of various embodiments of the disclosure. One skilled in the art, however, will understand that additional embodiments of the present disclosure may be practiced without several of the details described in the following description.

Figure 1:
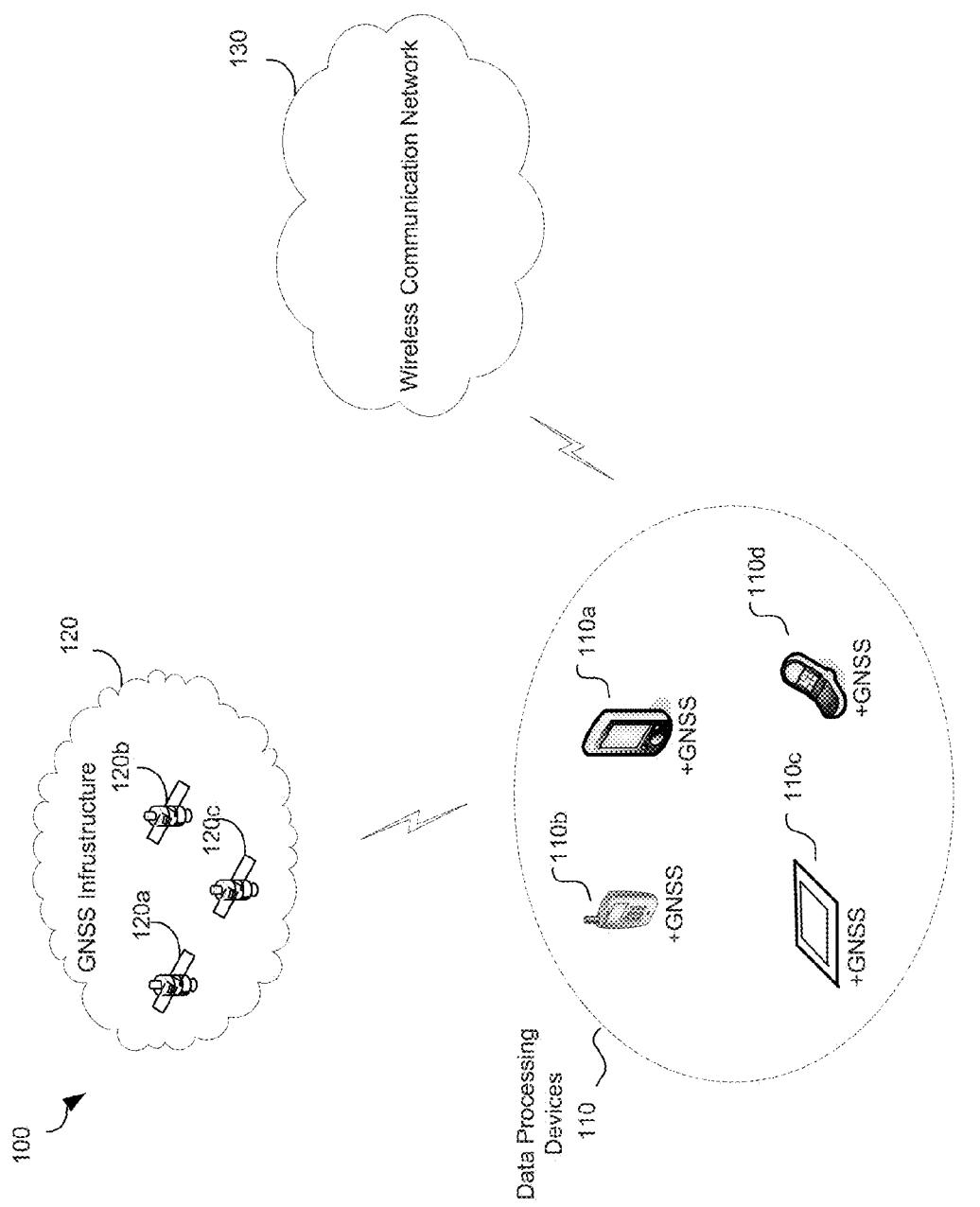
FIG. 1 is a block diagram illustrating an example communication system, in accordance with an example embodiment of the disclosure.

FIG. 1 is a block diagram illustrating an example communication system, in accordance with an example embodiment of the disclosure. Referring to FIG. 1, there is shown a communication system 100. The communication system 100 may comprise a plurality of data processing devices 110, of which data processing devices 110a-110d are illustrated, a global navigation satellite system (GNSS) infrastructure 120, and a wireless communication network 130. The GNSS infrastructure 120 may comprise a plurality of GNSS satellites, such as GNSS satellites 120a through 120c.

A data processing device, such as the data processing device 110a, may comprise suitable logic, circuitry, interfaces and/or code that may be operable to process data or signals. The data processing device 110a may be operable to communicate radio signals across the wireless communication network 130. The data processing device 110a may be a smart phone, a mobile phone, a tablet or some other wireless communication device, for example. The data processing device 110a may also be operable to receive GNSS broadcast signals from a plurality of visible GNSS satellites, such as GNSS satellites 120a through 120c in the GNSS infrastructure 120. The received GNSS signals may be utilized to determine navigation information, such as a position fix and/or a velocity of the data processing device 110a.

In an example, the data processing device 110a may comprise one or more applications. For example, a particular application among the one or more applications may be in one of a plurality of application states. Based on communication received from the particular application, the data processing device 110a may be operable to provide, to the particular application, power consumption and/or related information of the data processing device 110a associated with each of the plurality of application states and/or information related to one or more power-consuming components in the data processing device 110a.

A GNSS satellite, such as the GNSS satellite 120a, may comprise suitable logic, circuitry, interfaces and/or code that may be operable to provide satellite navigational information to various GNSS receivers on earth. In an example, the GNSS receivers, such as GPS, GALILEO or GLONASS receivers, may be integrated within GNSS capable data processing devices, such as the data processing devices 110a through 110d.

The wireless communication network 130 may comprise suitable logic, circuitry, interfaces, devices and/or code that may be operable to provide voice and data services to various data processing devices, such as the data processing devices 110a-110d, by using wireless communication technologies such as, for example, CDMA, WCDMA, TDMA, GSM, GPRS, UMTS, EDGE, EGPRS, OFDM, TD-SCDMA, HSDPA, LTE, WiMAX, WiFi, and/or Bluetooth.

In operation, a data processing device, such as the data processing device 110a, may communicate radio signals across the wireless communication network 130 using one or more wireless communication technologies. The data processing device 110a may receive GNSS signals or data from one or more GNSS satellites 120a-120c. Based on communication from a particular application among the one or more applications, the data processing device 110a may be operable to provide, to the particular application, power consumption information of the data processing device 110a associated with each of a plurality of application states of the particular application and/or information related to the one or more power-consuming components in the data processing device 110a. The particular application may then perform operations based on the provided power consumption information and/or the provided information related to the one or more power-consuming components.

The communication received from the particular application may comprise invoking or implementing, by the particular application, one or more particular application programming interfaces (APIs) associated with the data processing device 110a. The data processing device 110a may be operable to determine the provided power consumption information of the data processing device 110a utilizing one or more counters associated with the particular application. The one or more counters in the data processing device 110a may be reset based on the communication from the particular application. In this regard, the one or more counters may correspond to the one or more power-consuming components, respectively. The plurality of application states may comprise an application idle state and/or one or more application active states. The particular application may be considered as in some application active state when exercising some functionality or operation such as, for example, transmitting data over a network, requesting GNSS data, encoding media, decoding media, saving a file, capturing video, processing 3D image, reading sensor data, Central Processing Unit (CPU) computation (e.g., performing a computation known to be CPU-intensive), Graphical Processing Unit (GPU) operation (e.g., rendering an image or scene), display operation (e.g., turning on or changing brightness of the display), loudspeaker/headphones operation (e.g., playing audio or video), microphone interface operation (e.g., recording sound), Near Field Communication (NFC) transmitter/Infra-Red (IR) transmitter operation (e.g., transmitting data directly to another device), Light Emitting Diode (LED) operation (e.g., performing physical actions with actuators), image-capture device (e.g., capturing photos or video), etc.

Figure 2A:
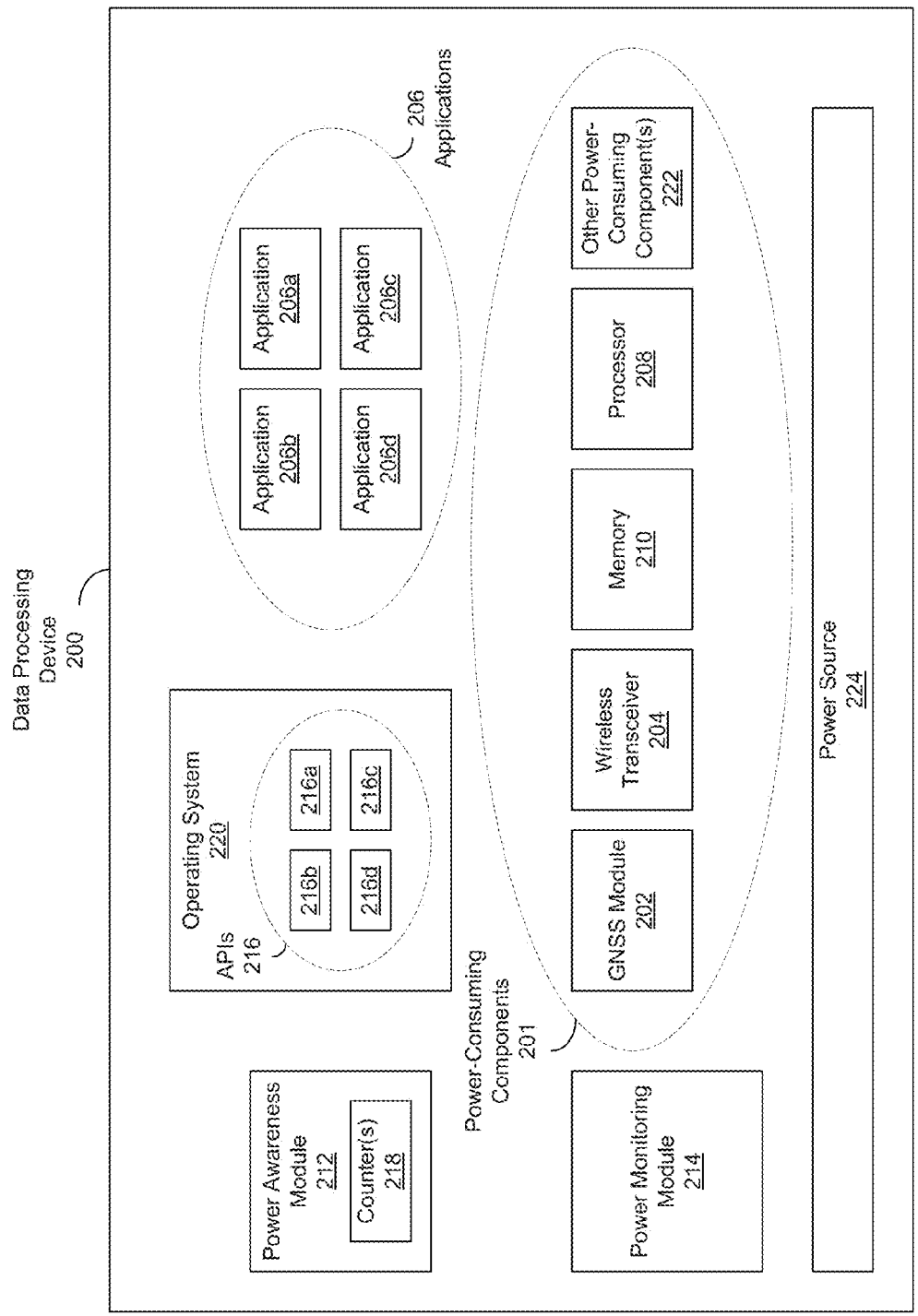
FIG. 2A is a block diagram illustrating an example data processing device, in accordance with an example embodiment of the disclosure.

FIG. 2A is a block diagram illustrating an example data processing device, in accordance with an example embodiment of the disclosure. Referring to FIG. 2A, there is shown a data processing device 200. The data processing device 200 may be substantially the same as the data processing device 110a described with respect to FIG. 1, for example. The data processing device 200 may comprise a power source 224, a power monitoring module 214, a power awareness module 212, and a plurality of power-consuming components 201. The data processing device 200 may comprise a plurality of applications 206 running on the data processing device 200, of which applications 206a-206d are illustrated.

The power-consuming components 201 may include any module that is likely to affect the power consumption of the data processing device 200, which module may be identified uniquely by the device's operating system (OS) (e.g., if the OS provides an API function for turning a "module" ON or OFF, that "module" is a power-consuming component). Such a module may be a distinct electronic circuit within the device 200, but the present disclosure may not be limited in this regard. In some instances, a distinct circuits may include multiple modules (e.g., a sensor module may contain multiple sensor, like gyro, accelerometer, etc., but if the OS provides a means for referring to such modules independently, then the modules may be considered separate modules and, therefore, separate power-consuming components). Furthermore, the above definition of power-consuming components is not limited to modules with ON/OFF states, but may also include modules with multiple states, where different states are likely to affect power consumption of the device 200 differently (e.g., a CPU may not have ON/OFF states, but the operating frequency may be used as a signal to correlate how the state of the CPU affects power consumption).

The power-consuming components 201 may comprise, for example, a GNSS module 202, a wireless transceiver 204, a processor 208, a memory 210 and one or more other power-consuming components 222. A device state may include a combination of states of all (or a curated subset of) the power-consuming components 201. For example, device state may include one or more of: CPU Frequency, CPU load (% time in use vs. idle), GPU load (% time in use vs. idle), Screen ON/OFF and brightness, Cellular radio ON/OFF and signal strength, WiFi radio ON/OFF and signal strength, Bluetooth ON/OFF and signal strength, GPS receiver ON/OFF, Loudspeaker ON/OFF and volume, Headphones interface ON/OFF and volume, Microphone interface ON/OFF, LED light ON/OFF, Accelerometer ON/OFF and sample frequency, RAM frequency, and/or FLASH memory read/write rates.

The GNSS module 202 may comprise suitable logic, circuitry, interfaces and/or code that may be operable to detect and receive GNSS signals or data from a plurality of visible GNSS satellites, such as the GNSS satellites 120a-120c (FIG. 1). The GNSS module 202 may be operable to utilize the received GNSS signals to calculate navigation information, such as a position fix and/or velocity of the GNSS module 202.

The wireless transceiver 204 may comprise suitable logic, circuitry, interfaces, and/or code that may be operable to communicate radio signals over the wireless communication network 130. The wireless transceiver 204 may communicate using wireless communication technologies, such as, for example, CDMA, WCDMA, TDMA, GSM, GPRS, UMTS, EDGE, EGPRS, OFDM, TD-SCDMA, HSDPA, LTE, WiMAX, WiFi, and/or Bluetooth.

The processor 208 may comprise suitable logic, circuitry, interfaces and/or code that may be operable to manage and/or control operations of various modules and/or components, such as, for example, the GNSS module 202, the wireless transceiver 204, the power monitoring module 214, and/or the power awareness module 212. The processor 208 may utilize an operating system (OS) 220 that enables the execution of various applications, such as the applications 206. In an example embodiment of the disclosure, the operating system (OS) 220 may comprise a plurality of APIs 216, of which APIs 216a-216d are illustrated. The processor 208 may also be operable to communicate signals with the wireless communication network 130 via the wireless transceiver 204. The processor 208 may be operable to communicate navigation information with the wireless communication network 130 for various navigation applications, such as location-based services.

The memory 210 may comprise suitable logic, circuitry, and/or code that may be operable to store information such as executable instructions and data that may be utilized by the processor 208 and/or other modules or components in the data processing device 200. The memory 210 may comprise RAM, ROM, low latency nonvolatile memory, such as flash memory and/or other suitable electronic data storage.

The power monitoring module 214 may comprise suitable logic, circuitry, and/or code that may be operable to provide power monitoring functions for the data processing device 200. The power monitoring module 214 may be integrated with or coupled to the power source 224, and may be operable to determine a type of the power source 224 (e.g., battery, USB power source, etc.). The power monitoring module 214 may be operable to measure or determine instantaneous power dissipation of consumption, as well as power dissipation over a period of time (e.g., by integrating). The power monitoring module 214 may provide a list of existing power-consuming components 201, may determine what applications are running (e.g., from the device's OS), and/or may provide power consumption information to the power awareness module 212, for example.

The power awareness module 212 may comprise suitable logic, circuitry, and/or code that may be operable to determine power consumption and/or related information of the data processing device 200, while one or more of the applications 206a-206d are running on the data processing device 200. The power awareness module 212 may communicate with the power monitoring module 214 for determining the power consumption information. The power awareness module 212 may utilize one or more counters 218 for determining the power consumption information associated with a particular application, such as the application 206a. In this regard, the one or more counters 218 may correspond to one or more power-consuming components 201 under consideration, respectively. In an example, for every power-consuming component 201, the power awareness module 212 may allocate storage for, for example, a usage counter (for counting a number of applications 206 using the particular power-consuming component), a state indicator (e.g., ON or OFF), and a power consumption counter (e.g., the counters 218) for each application using or in communication with the power awareness module 212. The power awareness module 212 may also associate each of the power-consuming components 201 with one or more applications 206a-206d that are using that component at a current time, for example.

The other power-consuming components 222 may comprise, for example, a GPU, a display unit, a speaker, a headphone interface, a microphone, a NFC transmitter, a LED, a media encoder, a media decoder, an accelerometer, a gyroscope, a light sensor and/or other hardware components that may consume power. The power source 224 may comprise, for example, a battery, a plugged-in power source, such as an USB power source, and/or other type of power source.

In operation, one or more of the applications 206a-206d may be running on the data processing device 200. Based on a communication from a particular application, e.g., 206a, the power awareness module 212 may be operable to provide, to the particular application 206a, power consumption information of the data processing device 200 associated with each of a plurality of application states of the particular application 206a and/or information related to the one or more power-consuming components 201. The plurality of application states may comprise an application idle state and one or more application active states. The communication received from the particular application 206a for the power consumption information and/or for the information related to the one or more power-consuming components 201 may comprise invoking or implementing, by the particular application 206a, one or more APIs 216 associated with the power awareness module 212. The power awareness module 212 may be operable to determine the provided power consumption information of the data processing device 200 utilizing one or more counters 218 associated with the particular application 206a. The one or more counters 218 may correspond to the one or more power-consuming components 201, respectively. In this regard, the one or more counters 218 may be reset based on the communication from the particular application 206a. For example, invoking, by the particular application 206a, one specific API such as the API 216b, may cause the power awareness module 212 to provide power consumption information of the data processing device 200, as well as to reset the one or more counters 218.

In an example, the particular application 206a may compute or determine, for each of the one or more application active states, power consumption information of the particular application 206a, based on the provided power consumption information of the data processing device 200 corresponding to the application idle state and to each of the one or more application active states. In such instances, the particular application 206a may determine whether the computed power consumption information of the particular application 206a is within power consumption guidelines of the data processing device 200. In this regard, based on the determination, the particular application 206a may generate an alert to a user of the data processing device 200, for example. Based on the determination, the particular application 206a may also change application settings of the particular application 206a, for example.

In one example, the provided information related to the one or more power-consuming components 201 may comprise component state information of a particular power-consuming component in the data processing device 200, a total number of one or more other applications such as the applications 206b-206d that, at a specified time, are using the particular power-consuming component, a current power source 224, and/or a current battery level indicating an amount of power remaining in the battery. In such instances, the particular application 206a may determine, based on the provided information, whether to perform or to defer an operation which may utilize the particular power-consuming component, for example.

In another example, the communication from the particular application 206a may comprise "request information," such as a request for notification when the one or more power-consuming components 201 in the data processing device 200 become active or being turned ON, and a time period that the particular application 206a is willing to wait before using the one or more power-consuming components 201. In such instances, the power awareness module 212 may be operable to track the request information received from the particular application 206a along with other request information received from one or more other applications 206b-206d for using the one or more power-consuming components 201. The power awareness module 212 may be operable to determine, based on the tracking, a schedule for the particular application 206a and for the one or more other applications 206b-206d to use the one or more power-consuming components 201. The power awareness module 212 may then be operable to provide, based on the determined schedule, a notification to the particular application 206a to use the one or more power-consuming components 201 in the data processing device 200.

FIG. 2B is a block diagram illustrating example counters in a data processing device, in accordance with an example embodiment of the disclosure. Referring to FIG. 2B, there is shown the application 206a registered with the power awareness module 212 in the data processing device 200. There is also shown the counters 218 associated with the registered application 206a, of which counters 218a-218m are illustrated. The counters 218a-218m may correspond to power-consuming components 201a-201m, respectively. The application 206a, the power awareness module 212, the counters 218 may be as described with respect to FIG. 2A, for example. The power-consuming components 201a-201m may be substantially the same as the power-consuming components 201 described with respect to FIG. 2A, for example.

In an example operation, when the application 206a invokes a first specific API, such as the API 216a to register with the power awareness module 212, the power awareness module 212 may assign a handle to the application 206a. The power awareness module 212 may be operable to allocate one or more counters 218a-218m associated with the assigned handle of the application 206a. When the application 206a invokes a second specific API, such as the API 216b for obtaining power consumption information and/or related information, the power awareness module 212 may retrieve power consumption information and/or related information from the power monitoring module 214. The power awareness module 212 may utilize the counters 218a-218m to track and record the power consumption information corresponding to the power-consuming components 201a-201m under consideration, respectively. Invoking of the API 216b may also cause the power awareness module 212 to reset the counters 218a-218m for subsequent usages.

Figure 3:
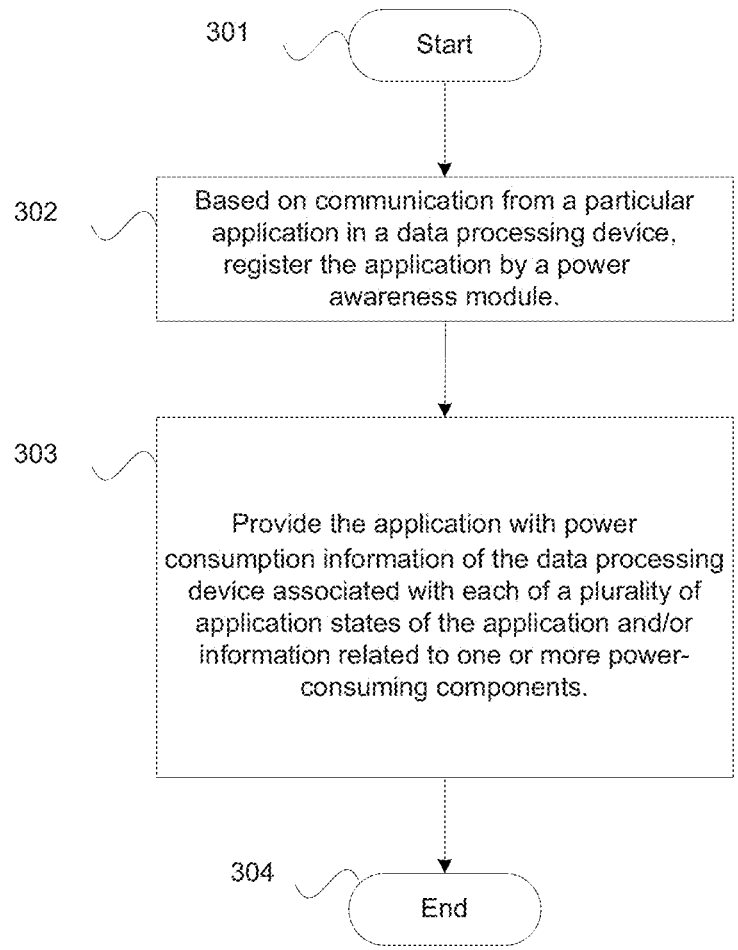
FIG. 3 is a flow chart illustrating example functions for power awareness in mobile applications, in accordance with an example embodiment of the disclosure.

FIG. 3 is a flow chart illustrating example functions for power awareness in mobile applications, in accordance with an example embodiment of the disclosure. Referring to FIG. 3, the example functions start at step 301. In step 302, based on communication from a particular application, such as the application 206a, the power awareness module 212 in the data processing device 200 may be operable to register the application 206a for providing it with information. In this regard, the communication from the application 206a may comprise, for example, invoking, by the application 206a, one specific API, such as the API 216a. In step 303, based on the communication from the application 206a, the power awareness module 212 may be operable to provide the application 206a with power consumption information of the data processing device 200. Such power consumption information may be associated with each of a plurality of application states of the application 206a and/or information related to one or more power-consuming components 201a-201m in the data processing device 200. In this regard, for example, the communication from the application 206a may comprise invoking, by the application 206a, one or more specific APIs such as the APIs 216b-216d. In such instances, the application 206a may be operable to perform operations based on the information provided by the power awareness module 212. The example functions may proceed to the end step 304.

Figure 4A:
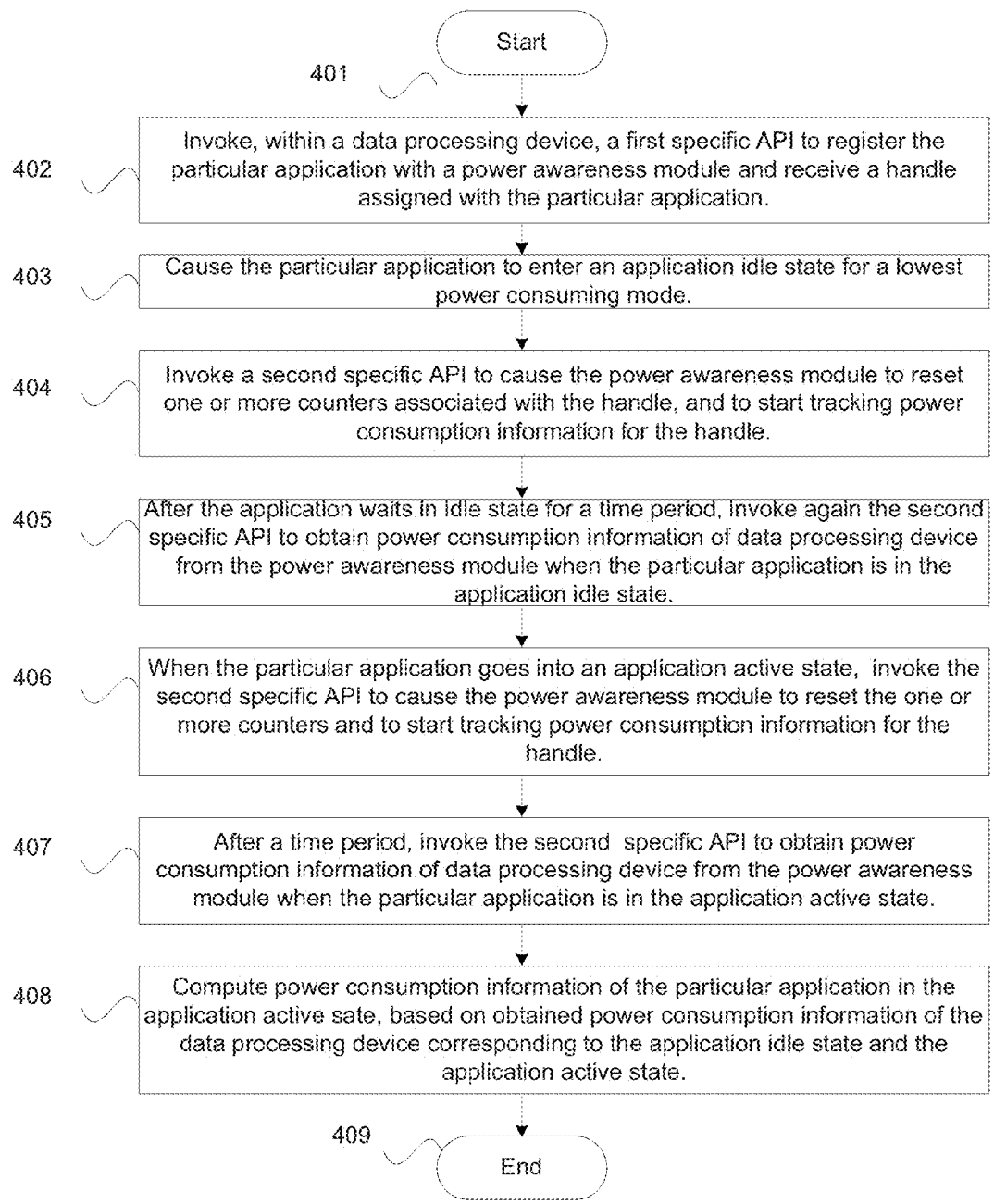
FIG. 4A is a flow chart illustrating example functions for computing power consumption information of a mobile application, in accordance with an example embodiment of the disclosure.

FIG. 4A is a flow chart illustrating example functions for computing power consumption information of a mobile application, in accordance with an example embodiment of the disclosure. Referring to FIG. 4A, the example functions start at step 401. In step 402, the particular application 206a may invoke a first specific API (e.g., power awareness API, such as API 216a), to register the application 206a with a power awareness module such as the power awareness module 212. Upon registration, the application 206a may receive a handle from the power awareness module 212. In step 403, the application 206a may be caused to enter an application idle state or a lowest power consuming mode.

In step 404, the application 206a may invoke a second specific API, such as the API 216b, to cause the power awareness module 212 to reset one or more of the counters 218a-218m associated with the handle of the application 206a, and to start tracking power consumption information for the application's handle. In step 405, the application waits in an idle state for a time period (e.g., a few seconds). The application 206a may invoke again the second specific API 216b to obtain power consumption information of the data processing device 200 from the power awareness module 212, while the application 206a is in the application idle state. The power awareness API may return a measure of the accumulated power consumption during the period of time the application was idle. The application may store this measure as a baseline for a subsequent comparison. In this regard, one of the units used for the power consumption information may be percent of battery capacity per day, for instance. For example, a value of 100 may indicate that a fully charged battery would last a time period (e.g., one day) at this power consumption rate. A value of 50 may indicate that a fully charged battery would last a different time period (e.g., two days) at this power consumption rate, for example.

In step 406, in instances when the application 206a goes into an application active state (e.g., transmitting data over a network), the application 206a may invoke the second specific API 216b to cause the power awareness module 212 to reset the one or more counters 218a-218m again and to start tracking power consumption information for the application's handle. In step 407, the application may remain in active state for a given time period (e.g., a few seconds). The application 206a may invoke the second specific API 216b to obtain power consumption information of the data processing device 200 from the power awareness module 212, while the application 206a is in the application active state. In step 408, the application 206a may be operable to compute power consumption information of the application 206a in the application active state, based on obtained power consumption information of the data processing device 200 corresponding to the application idle state and the application active state. For example, the power awareness API may return a measure of the accumulated power consumption during the time period the application was in an active state. The application may use this information to compare against the baseline obtained in step 405, and estimate the impact the application has on power consumption when in the active state. The example functions may proceed to the end step 409.

Figure 4B:
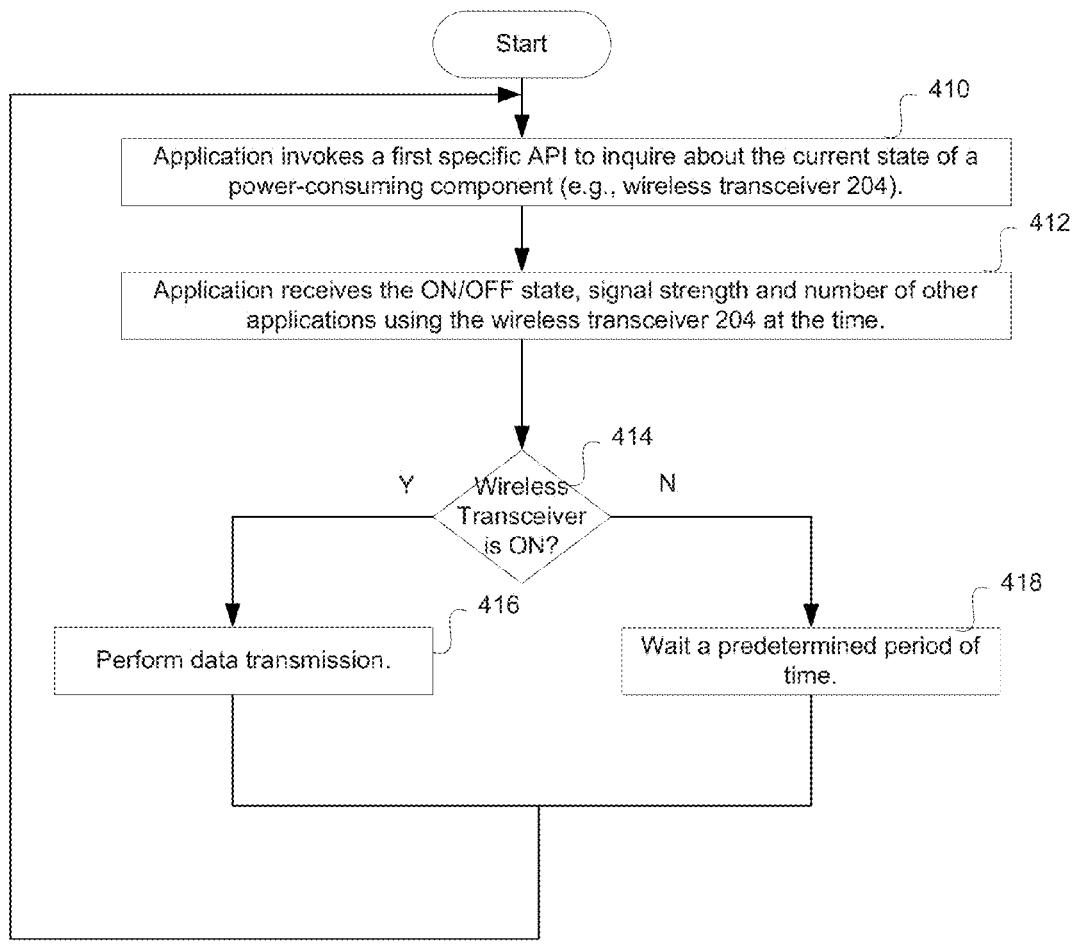
FIG. 4B is a flow chart illustrating example functions for using a power-consuming component by a mobile application, in accordance with an example embodiment of the disclosure.

FIG. 4B is a flow chart illustrating example functions for using a power-consuming component by a mobile application, in accordance with an example embodiment of the disclosure. The flow chart in FIG. 4B may consider an application (e.g., 206b) that uses a power-consuming component, e.g. wireless transceiver 204 for transmitting data. However, within the context of the application 206b, such use may be of low priority and may be deferred. For example, an application (e.g., 206b) may be running in the background and may periodically retrieve data from the Internet.

Referring to FIG. 4B, the example flow chart may start at 410, when an application (e.g., 206a) may invoke a first specific API (e.g., API 216a) to inquire about the current state of a power-consuming component (e.g., wireless transceiver 204). At 412, the application may receive the ON/OFF state, signal strength and number of other applications using the wireless transceiver 204 at the time. At 414, it may be determined whether the wireless transceiver 204 is ON. If it is ON, at 416, data transmission may be performed. If it is OFF, at 418, the application (e.g., 206a) may wait a predetermined period of time. At this point the loop may resume back at 410.

The example above considers only the ON/OFF state of the wireless transceiver 204. However, the disclosure may not be limited in this regard and many other examples may be envisioned where the application (e.g., 206a) considers other pieces of information to make a power-conscious decision of whether it should perform data transmission at a given time, or whether it should defer it.

For example, even if the wireless transceiver 204 is ON, the application may consider the signal strength of the wireless transceiver 204, under the assumption that at low signal strengths the cost, in terms of power consumption, is higher than at high signal strengths.

The application (e.g., 206a) may also keep track of the amount of time that has passed since it last used the wireless transceiver 204 for data transmission, and may decide to perform the data transmission, even if the wireless transceiver 204 is OFF. In this instance, the priority for performing data transmission is effectively increasing over time.

The application (e.g., 206a) may also consider the number of other applications using the wireless transceiver 204 at a given time. If that number is high enough (e.g., higher than a threshold number), the application may estimate that its own use of the module does not make much of a difference at that time, and then may decide to perform the data transmission.

The application (e.g., 206a) may invoke the power awareness API (e.g., 216a) to query for the current power source. For example, it may determine that if the device is "plugged in" (e.g., via a USB power source), expensive operations, in terms of power consumption, may be allowed, and it may decide to perform the data transmission.

The application (e.g., 206a) may invoke the power awareness API (e.g., 216a) to query for the current battery level (amount of power remaining in the battery). At battery levels below a predetermined threshold, the application may decide to defer the data transmission, or increase the period of time between attempts to transmit data.

Additionally, every time the application (e.g., 206a) performs data transmission, it may follow the procedure described in FIG. 4A to keep track of the impact such data transmission is having on power consumption. It may also use that information on subsequent decisions of whether to perform data transmission or defer it.

Figure 4C:
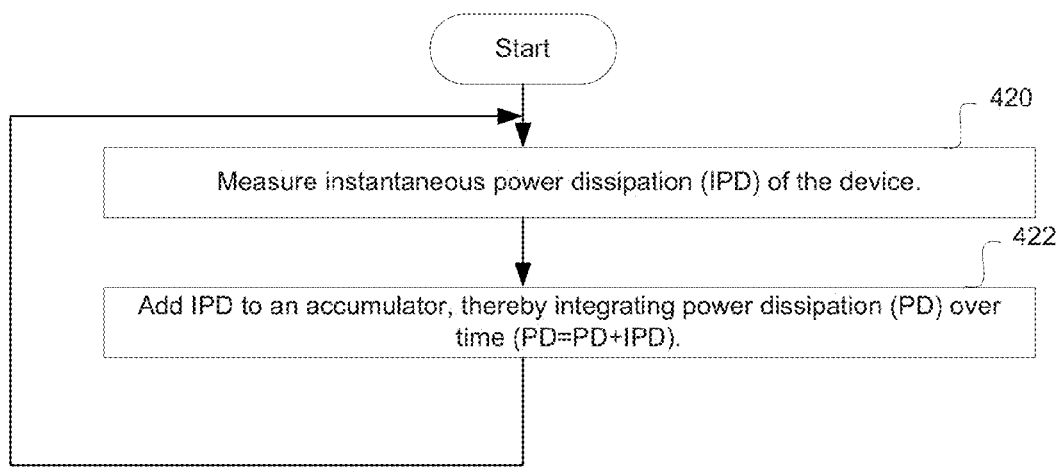
FIG. 4C is a flow chart illustrating example functions for determining instantaneous and overall power dissipation by a power monitoring module, in accordance with an example embodiment of the disclosure.

FIG. 4C is a flow chart illustrating example functions for determining instantaneous and overall power dissipation by a power monitoring module, in accordance with an example embodiment of the disclosure. Referring to FIG. 4C, the example flow chart may start at 420, instantaneous power dissipation (IPD) of the device may be measured. At 422, the IPD may be added to an accumulator, thereby integrating power dissipation (PD) over time (e.g., the following counter may be used: PD=PD+IPD). The loop of FIG. 4C may be performed at a predetermined frequency (e.g., every 1 ms).

Figure 4D:
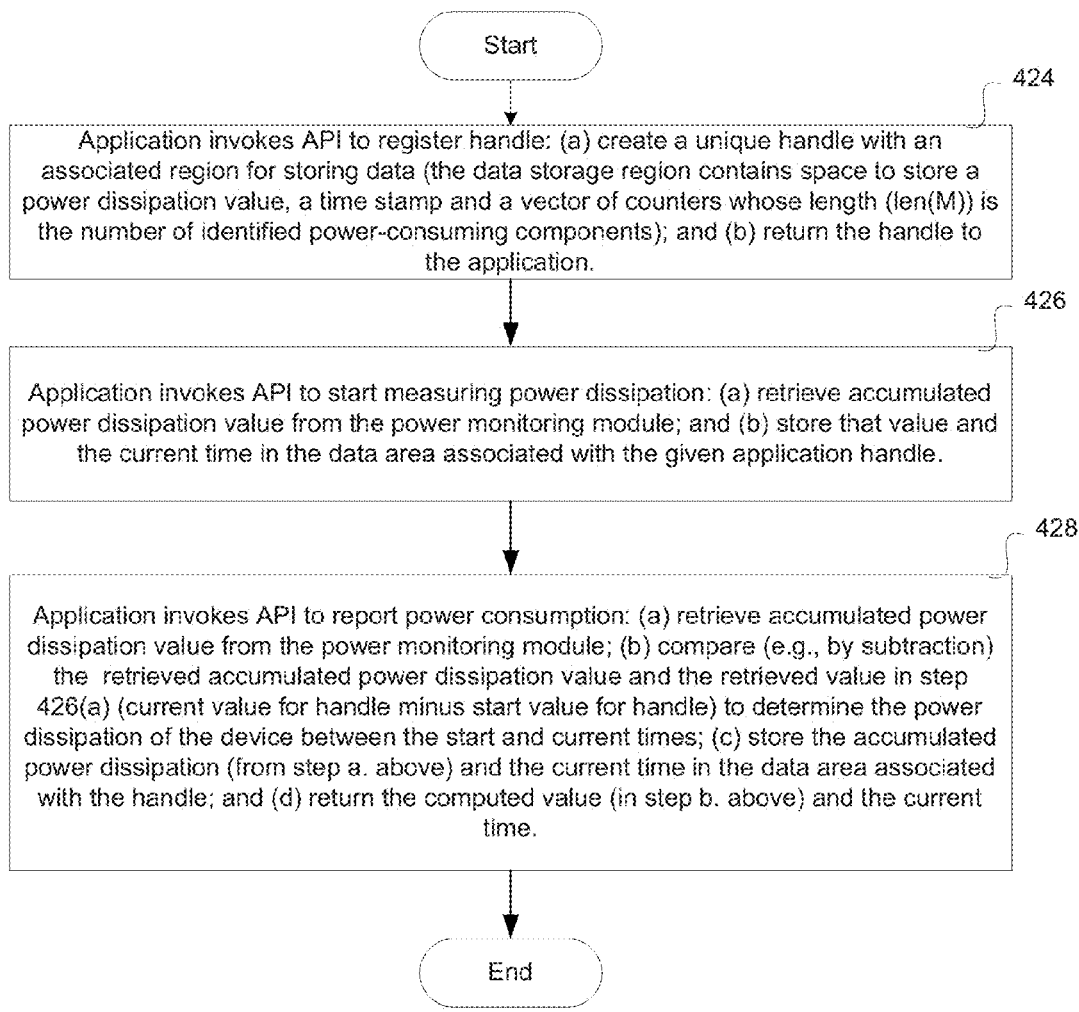
FIG. 4D is a flow chart illustrating example functions for determining per handle power dissipation by a power awareness module, in accordance with an example embodiment of the disclosure.

FIG. 4D is a flow chart illustrating example functions for determining per handle power dissipation by a power awareness module, in accordance with an example embodiment of the disclosure. Referring to FIG. 4D, the example flow chart may start at 424, when an application (e.g., 206a) may invoke API (e.g., 216a) to register a handle. In this regard, the following functions may take place: (a) create a unique handle with an associated region (e.g., the region of counters 218 in the power awareness module 212) for storing data (the data storage region may contain space to store a power dissipation value, a time stamp and a vector of counters (e.g., 218) whose length (len(M)) is the number of identified power-consuming components); and (b) return the handle to the application.

At 426, the application (e.g., 206a) may invoke an API (e.g., 216a) to start measuring power dissipation. In this regard, the following functions may take place: (a) retrieve accumulated power dissipation value from the power monitoring module 214; and (b) store that value and the current time in the data area associated with the given application handle.

At 428, the application (e.g., 206a) may invoke an API (e.g., 216a) to report power consumption. In this regard, the following functions may take place: (a) retrieve accumulated power dissipation value from the power monitoring module 214; (b) compare (e.g., by subtraction) the retrieved accumulated power dissipation value and the retrieved value in step 426(a) above (current value for handle minus start value for handle) to determine the power dissipation of the device between the start and current times; (c) store the accumulated power dissipation (from step a. above) and the current time in the data area associated with the handle; and (d) return the computed value (in step b. above) and the current time.

Figure 4E:
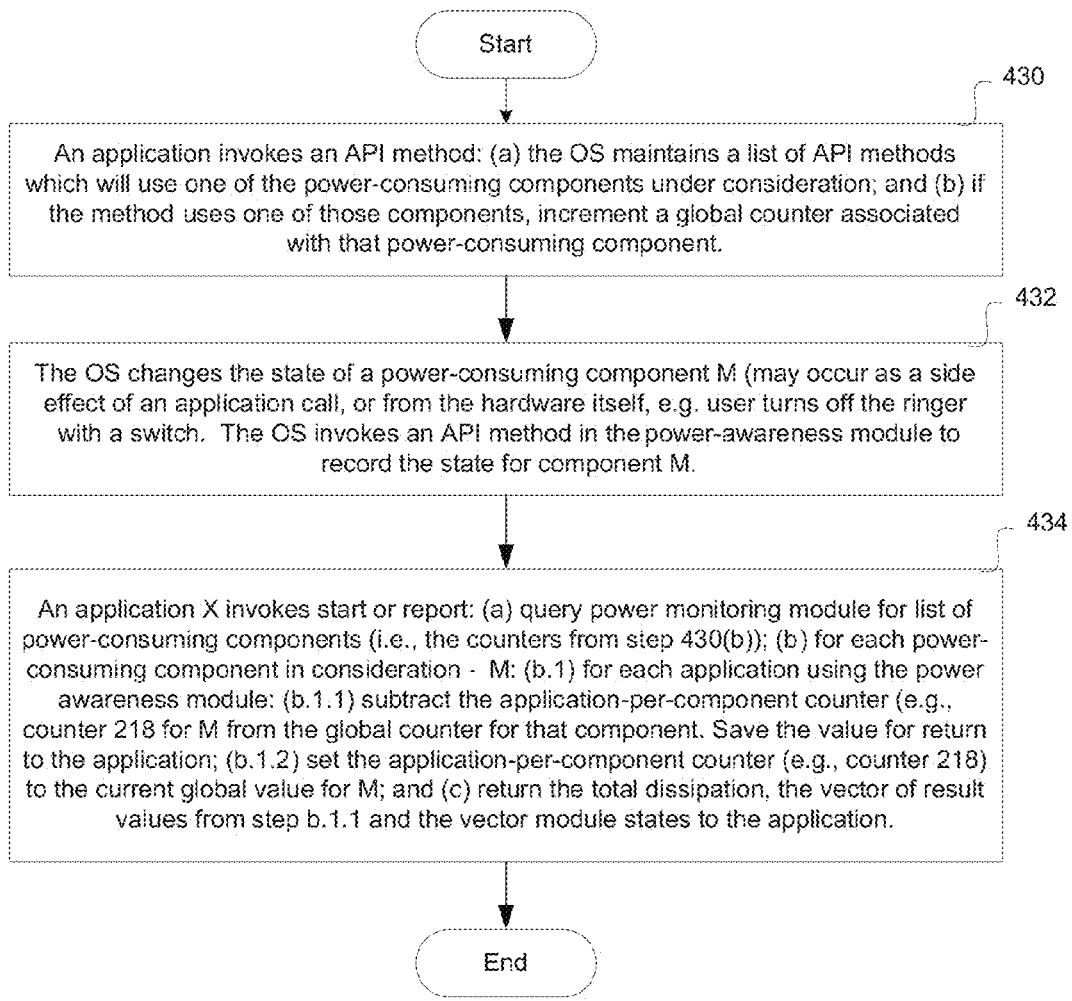
FIG. 4E is a flow chart illustrating example functions for determining per handle association of applications using power-consuming components, in accordance with an example embodiment of the disclosure.

FIG. 4E is a flow chart illustrating example functions for determining per handle association of applications using power-consuming components, in accordance with an example embodiment of the disclosure. Referring to FIG. 4E, the example flow chart may start at 430, when an application (e.g., 206a) may invoke an API method. In this regard, the following functions may be performed: (a) the OS may maintain a list of API methods, which will use one of the power-consuming components under consideration; and (b) if the API method uses one of those components, a global counter associated with that power-consuming component may be incremented.

At 432, the OS may change the state of a power-consuming component M (e.g., the change may occur as a side effect of an application call, or from the hardware itself, e.g. user turns off the ringer with a switch). The power-awareness module 212 may then be instructed to record the state for component M.

At 434, an application (e.g., X) may invoke start or report. In this regard, the following functions may be performed: (a) query power monitoring module 214 for a list of power-consuming components (i.e., the counters from step 430(b)); (b) for each power-consuming component in consideration, M, the following may be performed: (b.1) for each application using the power awareness module: (b.1.1) subtract the application-per-component counter (e.g., counter 218 for M from the global counter for that component. Save the value for return to the application; and (b.1.2) set the application-per-component counter (e.g., counter 218) to the current global value for M; and (c) return the total dissipation, the vector of result values from step b.1.1, and the vector module states to the application.

Figure 5:
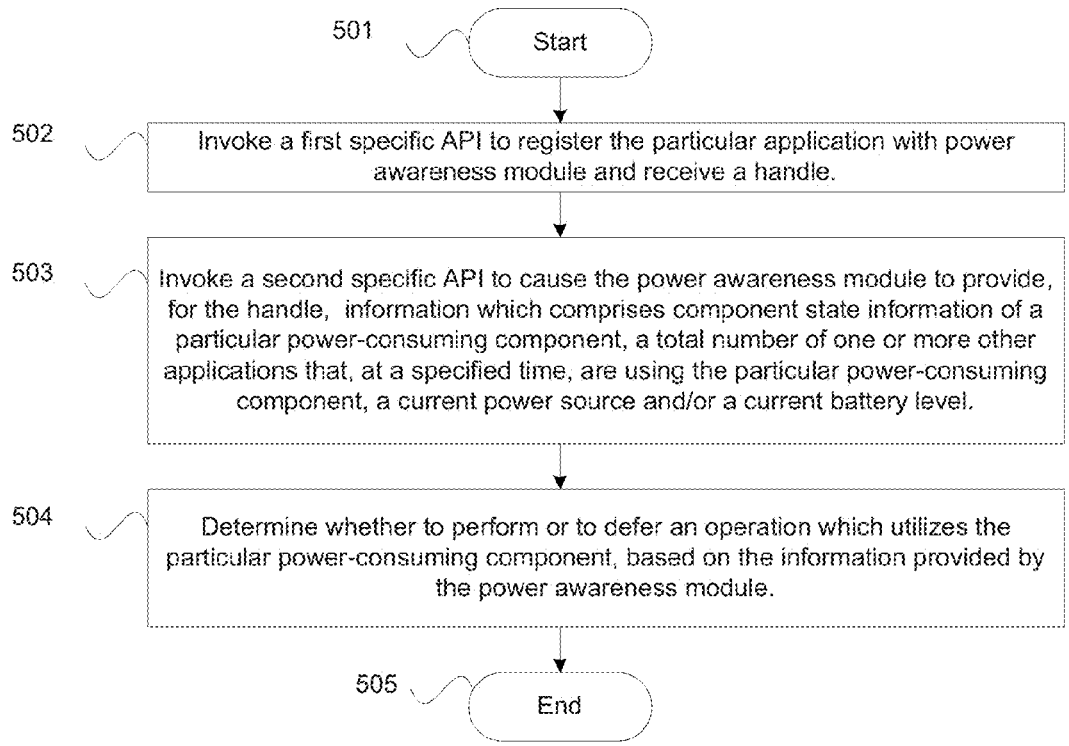
FIG. 5 is a flow chart illustrating example functions for determining whether to perform or defer an operation utilizing a particular power-consuming component, in accordance with an example embodiment of the disclosure.

FIG. 5 is a flow chart illustrating example functions for determining whether to perform or defer an operation utilizing a particular power-consuming component, in accordance with an example embodiment of the disclosure. Referring to FIG. 5, the example functions start at step 501. In step 502, the particular application 206a may invoke a first specific API such as the API 216a, to register the application 206a with a power awareness module, such as the power awareness module 212. Upon registration, the application 206a may receive a handle from the power awareness module 212. In step 503, the application 206a may invoke a second specific API, such as the API 216c, to cause the power awareness module 212 to provide, for the handle, information which may comprise component state information of a particular power-consuming component, such as the power-consuming component 201a, a total number of one or more other applications 206b-206d that, at a specified time, are using the power-consuming component 201a, a current power source 224, and/or a current battery level, for example.

In step 504, the application 206a may determine whether to perform or to defer an operation, which may utilize the power-consuming component 201a, based on the information provided by the power awareness module 212. In this regard, for example, the application 206a may invoke the API 216c to inquire about the current state of the wireless transceiver 204 for WiFi communication. The application 206a may be provided with the ON/OFF state, signal strength and the number of other applications 206b-206d that are using the wireless transceiver 204 at the specified time. In instances when the wireless transceiver 204 for the WiFi communication is ON, the application 206a may perform the data transmission via the wireless transceiver 204. In instance when the wireless transceiver 204 for the WiFi communication is OFF, the application 206 may wait for a determined period of time, for example. In other instances, even if the wireless transceiver 204 is ON, the application 206a may consider the signal strength of the wireless transceiver 204.

The application 206a may keep track of the amount of time that has passed since the application 206a last used the wireless transceiver 204 for data transmission, and may decide to perform the data transmission anyway, even if the wireless transceiver 204 is at low signal strength, for example. The application 206a may consider the number of other applications 206b-206d that are using the wireless transceiver 204 at the specified time. In instances when that number is high enough, the application 206a may estimate that its usage of the wireless transceiver 204 may not make much of a difference at that time, and may decide to perform the data transmission, for example. In some instances, the application 206a may determine that if the power source 224 is a plugged-in power source such as, for example, an USB power source, the application 206a may decide to perform the data transmission, for example. At battery levels which may be below a determined threshold, the application 206a may decide to defer the data transmission or to increase the period of time between attempts to transmit data, for example. The example functions may proceed to the end step 505.

Figure 6:
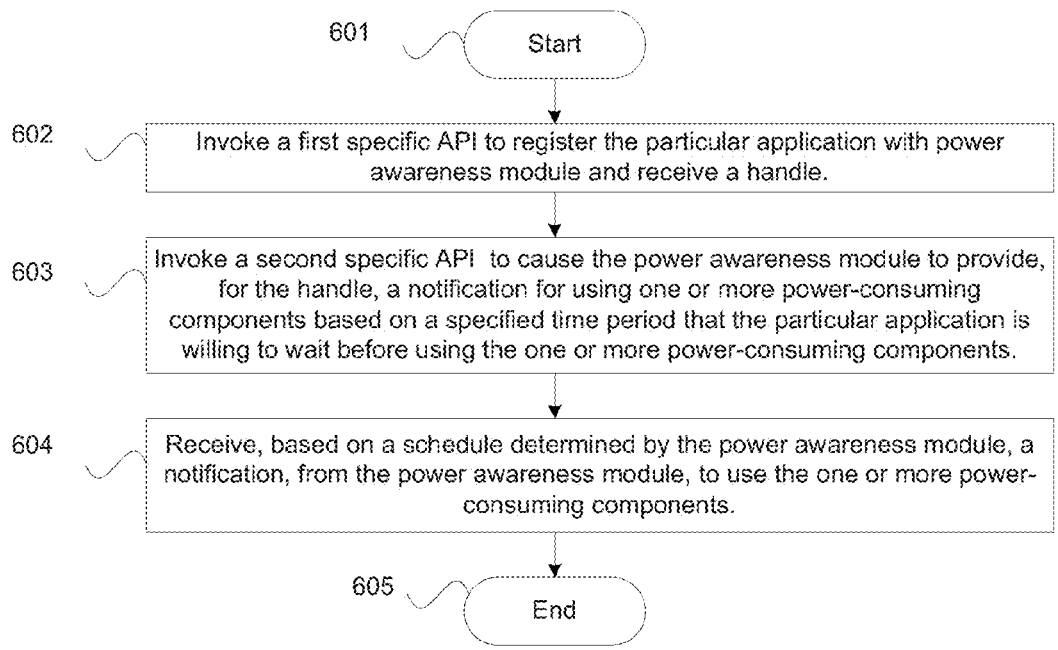
FIG. 6 is a flow chart illustrating example functions for a notification to use one or more power-consuming components, in accordance with an example embodiment of the disclosure.

FIG. 6 is a flow chart illustrating example functions for a notification to use one or more power-consuming components, in accordance with an example embodiment of the disclosure. Referring to FIG. 6, the example functions start at step 601. In step 602, the particular application 206a may invoke a first specific API such as the API 216a, to register the application 206a with a power awareness module, such as the power awareness module 212. Upon registration, the application 206a may receive a handle from the power awareness module 212. In step 603, the application 206a may invoke a second specific API, such as the API 216d, to cause the power awareness module 212 to provide, for the handle, a notification for using one or more power-consuming components, such as the power-consuming components 201a-201m, based on a specified time period that the application 206a is willing to wait before using the one or more power-consuming components 201a-201m.

In step 604, the application 206a may receive, based on a schedule determined by the power awareness module 212, a notification, from the power awareness module 212, to use the one or more power-consuming components 201a-201m. In this regard, the power awareness module 212 may be operable to track the request for notification from the application 206a along with other requests from one or more other applications 206b-206d for using the one or more power-consuming components 201a-201m. The power awareness module 212 may also track environmental conditions (e.g., signal strength, battery level, power source), for example. The power awareness module 212 may determine, based on the tracking, a schedule for the different applications 206a-206d to use the one or more power-consuming components 201a-201m. In this regard, the power awareness module 212 may use heuristics to compute the schedule, for example. The example functions may proceed to the end step 605.

Figure 7:
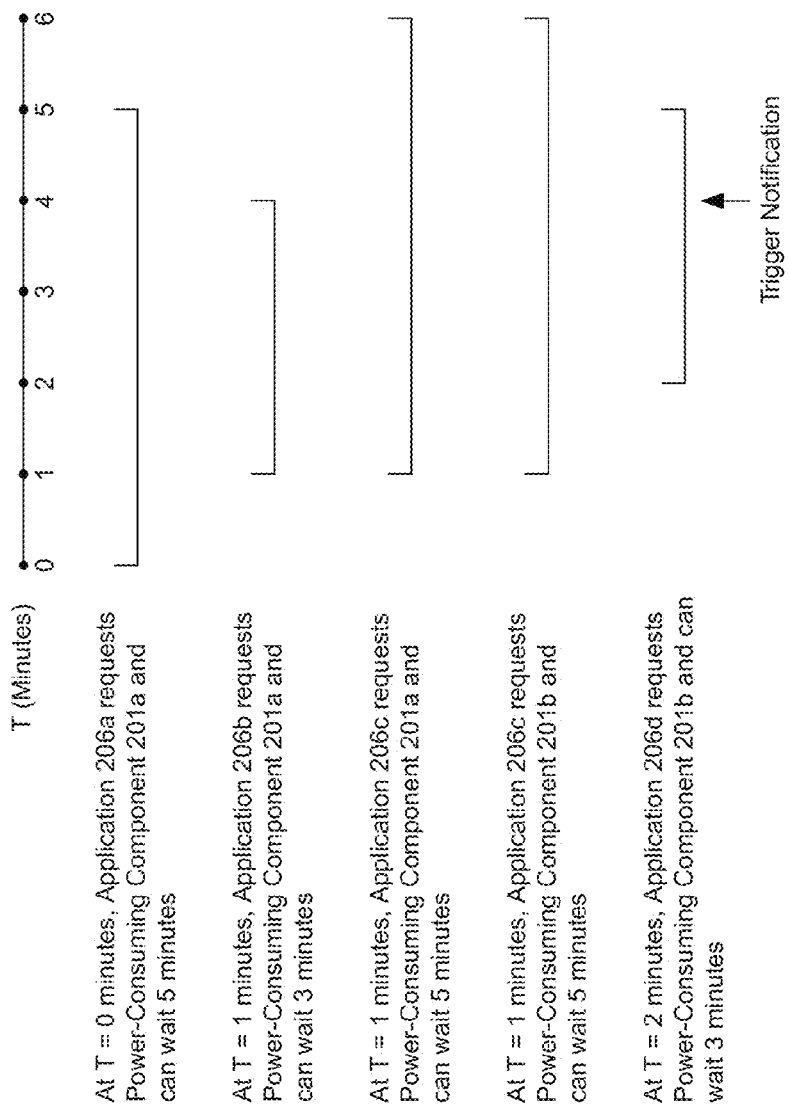
FIG. 7 is a block diagram illustrating example scenarios of a notification to use one or more power-consuming components, in accordance with an example embodiment of the disclosure.

FIG. 7 is a block diagram illustrating example scenarios of a notification to use one or more power-consuming components, in accordance with an example embodiment of the disclosure. Referring to FIG. 7, there is shown timing of functions performed by the applications 206a, 206b, 206c, 206d and the power-consuming components 201a, 201b. At T=0 minutes, the application 206a requests to use the power-consuming component 201a and is willing to wait 5 minutes before using the power-consuming component 201a. At T=1 minute, the application 206b requests to use the power-consuming component 201a and is willing to wait 3 minutes before using the power-consuming component 201a. At T=1 minute, the application 206c requests to use the power-consuming components 201a and 201b and is willing to wait 5 minutes before using the power-consuming components 201a and 201b. At T=2 minutes, the application 206d requests to use the power-consuming component 201b and is willing to wait 3 minutes before using the power-consuming component 201b.

In a first example scenario, each of the applications 206a-206d requests a notification when the one or more power-consuming components 201a, 201b become active. When the application 206c registers for notification (at T=1 minutes), the power awareness module 212 may decide that 3 applications are enough to justify turning on the power-consuming component 201a. The power awareness module 212 may immediately turn on the power-consuming component 201a, record that the applications 206a, 206b, 206c are using the power-consuming component 201a, notify all the three applications 206a, 206b, 206c, and cancel the notification requests. The applications 206a, 206b, 206c use the power-consuming component 201a, and when each of the applications 206a, 206b, 206c finishes use of the power-consuming component 201a, each of the applications 206a, 206b, 206c may indicate this to the power awareness module 212. When the application 206d registers to receive notification for the power-consuming component 201b (at T=2 minutes), the power awareness module 212 may turn on the power-consuming component 201b and notify the applications 206c and 206d.

In a second example scenario, the application 206c may need simultaneous use of the power-consuming components 201a and 201b. In such instances, each of the applications 206a-206d requests a notification when the one or more power-consuming components 201a, 201b become active. The applications 206a-206d may also set times to trigger the power awareness module 212 in instances when their waiting deadlines occur. For example, the waiting time of the application 206b expires at T=4 minutes. The application 206b may direct the power awareness module 212 to turn on the power-consuming component 201a (at T=4 minutes). The power awareness module 212 may turn on the power-consuming component 201a, record that applications 206a, 206b, 206c are using the power-consuming component 201a, notify all the three applications 206a, 206b, 206c that the power-consuming component 201a is available and cancel their notification requests. The applications 206a and 206b make use of the power-consuming component 201a.

The application 206c may not use the power-consuming component 201a until the power-consuming component 201b becomes available. Accordingly, the application 206c may direct the power awareness module 212 to turn on the power-consuming component 201b. The power awareness module 212 may turn on the power-consuming component 201b, record that the applications 206c and 206d are using the power-consuming component 201b, notify the applications 206c, 206d and cancel their notification requests. When the application 206c is done with using the power-consuming components 201a and 201b, the application 206c may indicate this to the power awareness module 212, and the power awareness module 212 may turn off the power-consuming component 201a, for example. When the application 206d is done with using the power-consuming component 201b, the application 206d may indicate this to the power awareness module 212, and the power awareness module 212 may turn off the power-consuming component 201b, for example.

In a third example scenario, each of the applications 206a-206d requests a notification when the one or more power-consuming components 201a, 201b become active. The power awareness module 212 may determine that, at T=4 minutes, it would be a good time for the power-consuming components 201a and 201b to be turned on. Accordingly, the power awareness module 212 may turn on the power-consuming components 201a and 201b at T=4 minutes, record that the applications 206a, 206b, 206c are using the power-consuming component 201a and the applications 206c, 206d are using the power-consuming components 201b, notify the applications 206a, 206b, 206c, 206d to proceed (as shown by the trigger notification arrow in FIG. 7), and cancel their notification requests. The applications 206a, 206b, 206c, 206d make use of the power-consuming components 201a and 201b concurrently. When each of the applications 206a, 206b, 206c, 206d is done with using the power-consuming component 201a and/or the power-consuming component 201b, each of the applications 206a, 206b, 206c, 206d may indicate this to the power awareness module 212. In this regard, when the power awareness module 212 determines that the last application has stopped using a power-consuming component, the power awareness module 212 may turn that power-consuming component off.

In the fourth example scenario, assuming, for example, that each of the applications 206a-206d may use a power-consuming component for 10 seconds and that an overhead of concurrent use of a power-consuming component is negligible (i.e., the applications 206a-206d may all use the power-consuming components 201a during the same 10 seconds and get their works done), the power-consuming component 201a may only be turned on for a total of 10 seconds at T=4 minutes to be used by the applications 206a-206d. However, without the notification to use the power-consuming components 201a at T=4 minutes, the power-consuming component 201a may be turned on at T=0 minutes for 10 seconds, again at T=1 minutes for 10 seconds, and again at T=2 minutes for 10 seconds, for example. Thus, without the notification, the power-consuming component 201a would have been in an "ON" state for 30 seconds as opposed to 10 seconds with the notification.

In various embodiments of the disclosure, a data processing device, such as the data processing device 200, may comprise one or more applications 206a-206d running on the data processing device 200. Based on communication from a particular application, such as the particular application 206a among the one or more applications 206a-206d, a power awareness module, such as the power awareness module 212 in the data processing device 200, may be operable to provide, to the application 206a, power consumption information of the data processing device 200 associated with each of a plurality of application states of the application 206a and/or information related to one or more power-consuming components 201a-201m in the data processing device 200. The application 206a may then perform operations based on the provided power consumption information and/or the provided information related to the one or more power-consuming components 201a-201m.

The communication received from the application 206a may comprise invoking or implementing, by the application 206a, one or more particular APIs 216a-216d associated with the power awareness module 212 in the data processing device 200. The power awareness module 212 may be operable to determine the provided power consumption information of the data processing device 200 utilizing one or more counters 218a-218m associated with the application 206a, where the one or more counters 218a-218m in the power awareness module 212 may correspond to the one or more power-consuming components 201a-201m, respectively. The one or more counters 201a-201m may be reset based on the communication from the application 206a. The plurality of application states may comprise an application idle state and one or more application active states. The application 206a may be considered as in some application active state when exercising some functionality such as, for example, transmitting data over a network, requesting GNSS data, encoding media, decoding media, saving a file, capturing video, processing 3D image, reading sensor data and/or other application activity.

The communication from the application 206a may comprise request information which includes a request for notification when the one or more power-consuming components 201a-201m in the data processing device 200 become active or are turned on, and a time period that the application 206a is willing to wait before using the one or more power-consuming components 201a-201m. In such instances, the power awareness module 212 may be operable to track the request information received from the application 206a along with other request information received from one or more other applications 206b-206d for using the one or more power-consuming components 201a-201m. The power awareness module 212 may be operable to determine, based on the tracking, a schedule for the application 206a and for the one or more other applications 206b-206d to use the one or more power-consuming components 201a-201m. The power awareness module 212 may then be operable to provide, based on the determined schedule, a notification to the application 206a to use the one or more power-consuming components 201a-201m in the data processing device 200.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the functions as described herein for power awareness in mobile applications.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
   receiving, at a device comprising one or more applications and one or more power-consuming components, power consumption information indicative of an amount of power consumption by a power-consuming component of the one or more power-consuming components;
   receiving battery information indicative of power remaining in a battery of the device;
   receiving a request from a particular application of the one or more applications to perform an operation utilizing the power-consuming component, wherein the particular application is configured to provide an indication of a period of time the particular application is configured to wait before using the power-consuming component to perform the operation; and providing, based on the power consumption information, the battery information, and the period of time, a notification to the particular application indicating when the power-consuming component is available for use by the particular application.

2. The method of claim 1, wherein receiving the power consumption information comprises:
receiving information indicative of a number of applications of the one or more applications that are using the power-consuming component, wherein providing the notification is based on the total number of applications.

3. The method of claim 1, wherein providing the notification to the particular application comprises:
providing to the particular application, based on the power consumption information, a respective indication associated with whether the particular application should perform the operation or defer performing the operation for a given period of time.

4. The method of claim 1, wherein providing the notification comprises:
providing the notification to defer performing the operation for a given period of time based on the battery information indicating that the power remaining in the battery is less than a predetermined threshold.

5. The method of claim 1, wherein the operation comprises: transmitting data over a network, requesting global navigation satellite system (GNSS) data, encoding media, decoding media, saving a file, capturing an image or a video, processing 3D image, reading sensor data, a Central Processing Unit (CPU) computation, a Graphical Processing Unit (GPU) rendering an image or scene, turning on or changing brightness of a display, playing an audio or a video, recording a sound, transmitting data directly to another device using a Near Field Communication or Infra-Red transmitter, or performing a physical action with an actuator.

6. The method of claim 1, further comprising:
receiving state information indicative of whether the particular application is in an idle state or in an active state; and
estimating, based on the state information, power consumption of the particular application upon using the power-consuming component to perform the operation, wherein providing the notification is further based on the estimated power consumption of the particular application.

7. The method of claim 6, wherein estimating the power consumption of the particular application comprises:
determining a baseline power consumption associated with the particular application; and
estimating change in power consumption associated with the particular application, if the operation is performed.

8. The method of claim 1, wherein the amount of power consumption by the power-consuming component is based on component state information comprising one or more of: component ON/OFF, radio signal strength, component operating frequency, component usage load, display brightness, speaker volume, and non-volatile memory writing/reading.

9. The method of claim 1, further comprising:
tracking the request from the particular application along with other requests from one or more other applications for using the power-consuming component; and
determining, based on the tracking, a schedule for the particular application and for the one or more other applications to use the power-consuming component, wherein providing the notification is based on the schedule.

10. A device, comprising:
one or more applications;
one or more power-consuming components;
a battery;
at least one processor configured to execute the one or more applications and in communication with the one or more power consuming components, and the battery; and
data storage comprising instructions that, when executed by the at least one processor, cause the device to perform functions comprising:
receiving power consumption information indicative of an amount of power consumption by a power-consuming component of the one or more power-consuming components;
receiving battery information indicative of power remaining in the battery;
receiving a request from a particular application of the one or more applications to perform an operation utilizing the power-consuming component, wherein the particular application is configured to provide an indication of a period of time the particular application is configured to wait before using the power-consuming component to perform the operation; and
providing, based on the power consumption information, the battery information, and the period of time, a notification to the particular application indicating when the power-consuming component is available for use by the particular application.

11. The device of claim 10, wherein the operation comprises: transmitting data over a network, requesting global navigation satellite system (GNSS) data, encoding media, decoding media, saving a file, capturing video, processing 3D image, or reading sensor data, a Central Processing Unit (CPU) computation, a Graphical Processing Unit (GPU) rendering an image or scene, turning on or changing brightness of a display, playing an audio or a video, recording a sound, transmitting data directly to another device using a Near Field Communication or Infra-Red transmitter, or performing a physical action with an actuator.

12. The device of claim 10, wherein the function of providing the notification to the particular application comprises:
providing to the particular application, based on the power consumption information, a respective indication associated with whether the particular application should perform the operation or defer performing the operation for a given period of time.

13. The device of claim 10, wherein the functions further comprise:
receiving state information indicative of whether the particular application is in an idle state or in an active state; and
estimating, based on the state information, power consumption of the particular application upon using the power-consuming component to perform the operation, wherein providing the notification is further based on the estimated power consumption of the particular application.

14. The device of claim 13, wherein the function of estimating the power consumption of the particular application comprises:
determining a baseline power consumption associated with the particular application; and
estimating change in power consumption associated with the particular application, if the operation is performed.

15. The device of claim 10, wherein the functions further comprise:
    tracking the request from the particular application along with other requests from one or more other applications for using the power-consuming component; and
    determining, based on the tracking, a schedule for the particular application and for the one or more other applications to use the power-consuming component, wherein providing the notification is based on the schedule.

16. A method comprising:
    obtaining, by an application among a plurality of applications executable by a device having one or more power-consuming components, power consumption information indicative of power consumption resulting from the application utilizing a power-consuming component of the one or more power-consuming component to perform an operation;
    receiving battery information indicative of power remaining in a battery of the device and a rate of power consumption of the battery as a result of the plurality of applications utilizing the one or more power-consuming components; and
    the application determining, based on the power consumption information, the battery information, and information associated with a period of time the application is configured to wait before using the power-consuming component to perform the operation, whether to continue performing the operation or defer the operation for a predetermined amount of time.

17. The method of claim 16, wherein obtaining the power consumption information comprises:
    obtaining information indicative of a baseline power consumption associated with the application;
    obtaining information indicative of power consumption of the device as the operation is being performed by the application; and
    making a comparison between the power consumption of the device as the operation is being performed and the baseline power consumption.

18. The method of claim 16, further comprising:
    the application providing state information indicating whether the application is in an idle state or in an active state, wherein the power consumption resulting from the application utilizing the power consuming component is based on state information, and wherein obtaining the power consumption information is based on the state information.

19. The method of claim 16, further comprising:
    the application deferring performing the operation for a given period of time based on the battery information indicating that the power remaining in the battery is less than a predetermined consumption threshold.

20. The method of claim 16, further comprising:
    the application deferring performing the operation for a given period of time based on the battery information indicating that the rate of power consumption of the battery is greater than a predetermined rate threshold.

* * * * *